(12) United States Patent
Chen et al.

(10) Patent No.: US 6,764,565 B2
(45) Date of Patent: Jul. 20, 2004

(54) METHOD OF PRODUCING LITHIUM ALUMINOSILICATE CERAMICS

(75) Inventors: Jyh-Chen Chen, Taoyuan (TW); Gwo-Jiun Sheu, Tainan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 10/320,395

(22) Filed: Dec. 17, 2002

(65) Prior Publication Data

US 2004/0112503 A1 Jun. 17, 2004

(51) Int. Cl.⁷ .................. B32B 31/26; C04B 35/19; C04B 35/64
(52) U.S. Cl. .................. 156/89.11; 156/89.28; 264/662; 264/681
(58) Field of Search .................. 156/89.11, 89.14, 156/89.16, 89.28; 264/603, 615, 662, 661, 681

(56) References Cited

U.S. PATENT DOCUMENTS

| | | | |
|---|---|---|---|
| 3,764,529 A | * | 10/1973 | Matsuo et al. .................. 252/1 |
| 4,981,633 A | * | 1/1991 | Alles et al. .................. 264/616 |
| 5,320,792 A | * | 6/1994 | Wu et al. .................. 264/621 |
| 6,066,585 A | * | 5/2000 | Swartz .................. 501/128 |
| 6,372,677 B1 | * | 4/2002 | Nose et al. .................. 501/119 |
| 6,566,290 B2 | * | 5/2003 | Beall et al. .................. 501/128 |

FOREIGN PATENT DOCUMENTS

JP 8-330179 * 12/1996

* cited by examiner

Primary Examiner—Melvin C. Mayes
(74) Attorney, Agent, or Firm—Rosenberg, Klein & Lee (57) ABSTRACT

A method of producing lithium aluminosilicate (LAS) ceramics, which uses a mixing powder of lithium carbonate, aluminum oxide, and silicon oxide as a raw material powder. After being mixed by ball milling and baked dry, the raw material powder is processed with a calcinations process such that the raw material powder becomes a precursor. The precursor is then pressed into the green ceramic. Significantly, the high heat conducting metal sheets are tightly attached above and below the surfaces of the ceramic during sinter and heat-treatment processes. A solid-state sinter process is performed with the green ceramic. Next, the ceramic is treated with a proper heat-treatment process. Since the top and bottom surfaces of the ceramic are capped with the high heat conducting metal, the ceramics are uniformly heated during all the heating processes. The ceramics of this invention exhibit more uniform properties and stable structure, which allow them to be used as temperature compensation components and athermal products.

16 Claims, 8 Drawing Sheets

METHOD OF PRODUCING LITHIUM ALUMINOSILICATE CERAMICS

FIELD OF THE INVENTION

This invention relates to a method of producing ceramics material, and more particularly, to a method for producing lithium aluminosilicate (LAS) ceramics.

BACKGROUND OF THE INVENTION

Recently the performance of the precision device and the instrument equipment in high-tech system is limited by the problem of thermal expansion. To avoid this problem, it is required to develop the negative thermal expansion material to compose them into an athermal device so that the original device performance is maintained without being influenced by the variation of ambient temperature. For example, the fiber Bragg grating (FBG) device had composed the negative thermal expansion material with optic fiber to reduce the influence of the temperature on the index of refraction in the grating. It is known that the LAS ceramics with β-eucryptite structure has been successfully used in FBG system. Besides, such technology also could be applied into the high-speed rotor of the CNC machine for thermal compensation. So it has been needed to develop the suitable fabrication process of negative thermal expansion ceramics with more uniform properties and stable structure.

The main compounds of the LAS system are β-eucryptite ($LiAlSiO_4$) with negative expansion, Spodumene ($LiAlSi_2O_6$) with almost zero expansion, and Petalite ($LiAiSi_4O_{10}$). In which, the thermal expansion coefficient (CTE) of sintered anisotropy β-eucryptite ceramics are about $-8\times10^{-6}/°C.$, and they also have the advantages such as high mechanical strength, strong chemical corrosion-resistance and thermal-shock resistance, as well as fine size stability.

It is disclosed in many articles about the manufacturing method of the LAS ceramics. U.S. Pat. No. 6,087,280 discloses the method of manufacturing LAS ceramic material uses a melting glass-ceramic process including heat-treatment for controlling crystallization. However this method may result in different crystallizations with phase-separation and generate large thermal stress during the quenching process. Another, the negative-expansion ceramics substrate of the β-quartz using the sinter method is disclosed by A. Sakamoto, wherein the coefficient of thermal expansion is adjusted by changing the difference between each ratio of the components. Even so, there is no refer to the calcinations of the precursor and the heat treatment after sintering. Besides, U.S. Pat. No. 6,066,585 discloses that the powder calcined temperature is 1000° C.~1100° C. whereas the sinter temperature is 1200° C.~1300° C., which could transform fully the crystal phase from the low-temperature phase into the β-eucryptite ($LiAlSiO_4$) with high temperature. However, it emphasizes the improved mechanical properties by adjusting the stoichiometric composition of $Li_{1+x}AlSiO_{4+x/2}$, and no refer to the microstructure of ceramics with stable properties and the proper heat treatment. Therefore, it has been needed to develop the method of manufacturing LAS ceramic substrates in order to obtain the better structure and quality of ceramics.

SUMMARY OF THE INVENTION

To achieve these and other advantages and in order to overcome the disadvantages of conventional methods in accordance with the purpose of the invention as embodied and broadly described herein, the present invention an improved manufacturing method for producing LAS ceramics.

In view of this, an object of the present invention is to provide a manufacturing method for LAS ceramics, which have uniform and stable thermal expansion coefficients, a more linear expansion curve, and a denser and more stable structure.

The present invention provides a manufacturing method for LAS ceramics. The method mixes lithium carbonate, aluminum oxide, and silicon oxide as a raw material powder. After mixing by ball-milling and drying the raw material powder, a calcinations process forms a precursor from the raw material powder. Next, the precursor is pressed into a green ceramic. The high-heat-conducting metal sheets are adhered tightly on both the upper and below surfaces of the green ceramic. The high-heat-conducting metal sheet material is a metal with a conducting coefficient higher than 10 W/mK. Next, a sintering process processes the green ceramic into ceramic. Finally, a heat-treatment process is performed.

The method of the present invention manufactures LAS ceramics utilizing a solid-state sintering method. During the heating processes, including the sinter process and the heat-treatment process, the high-heat-conducting metal sheets help to ensure uniformity of the ceramics in the temperature gradient. The high-heat-conducting metal sheet should be tightly adhered to the ceramics to ensure uniformity of the heat transfer. Additionally, after the sinter process, a heat treatment process is used to improve the heat-expansion hysteresis and thermal instability of the ceramics.

The present invention synthesizes the LAS ceramics using powders of lithium carbonate, aluminum oxide, and silicon oxide. In certain cases, problems of oxide corrosion or ceramics corrosion caused by lithium carbonate in a high-temperature reaction can result. However, the present invention performs a calcinations process to make the precursor from the raw material powders before the sintering process. Therefore oxide or ceramics corrosion during high temperature is prevented and the sinter process of the ceramics is successfully completed.

Additionally, the present invention utilizes the high-heat-conducting metals tightly attached to the top and bottom surfaces of the green ceramic during the sintering process, which allows for a more uniform heat transfer on the ceramic. In this way, the grains of ceramic are uniformly heated and treated during the sinter process, which lowers the aggregate effects of the anisotropic ceramic crystals so that the whole grains of ceramic crystal are more randomly arranged and distributed. Also, the subsequent heat-treatment process provides recovery and re-growing between the grains and forms the ceramics with a denser as well as a more stable structure.

The present invention further provides a manufacture method of ceramics material. After providing a precursor, the precursor is pressed into a green ceramic. The high-heat-conducting metal sheets are tightly attached, for example by pasting, on both the upper and below surfaces of the ceramic. Next, a sinter process is performed forming the green ceramic into ceramic. Then, a heat-treatment process is performed.

The precursor is provided by using a mixing powder with at least one component as a raw material powder. After mixing and milling and drying the raw material powders, a calcinations process is performed on the raw material powders so that the raw material powders form the precursor.

The present invention produces the ceramic material utilizing a solid state sintering method. A high heat-conducting metal sheet acts as a cap during all the ceramic-heated process including the sinter process and the heat treatment process to ensure uniform heating. The high heat-conducting metal sheets are pasted tightly to the ceramics to make the heat transfer with uniform. Next, after the sinter process, a heat-treatment process is performed to improve the heat-expansion properties and thermal instability of the ceramics.

The method of the present invention uses the high-heat-conducting metal on the top and bottom of the ceramics during the sinter process of the ceramics, which allows more uniform heat transfer to the ceramic. Since the heat is uniformly transferred during the sinter process the aggregate effects of the anisotropic ceramic crystals are decreased, which makes the whole crystals more randomly arranged and distributed. Finally, the subsequent heat-treatment process makes the recovery and re-growth between the grains which form the ceramics, denser and with more stable structure.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

The method of ceramic production of the present invention synthesizes the ceramics utilizing calcinations treatment of the precursor. Next a solid-state sintering process is performed. Before the sintering process is performed, the high heat-conducting metal sheets tightly attached above and below the ceramics so that the ceramics are heated uniformly. Then a proper heat-treatment is performed and the ceramics body with a denser and more stable structure is achieved.

Figure 1:
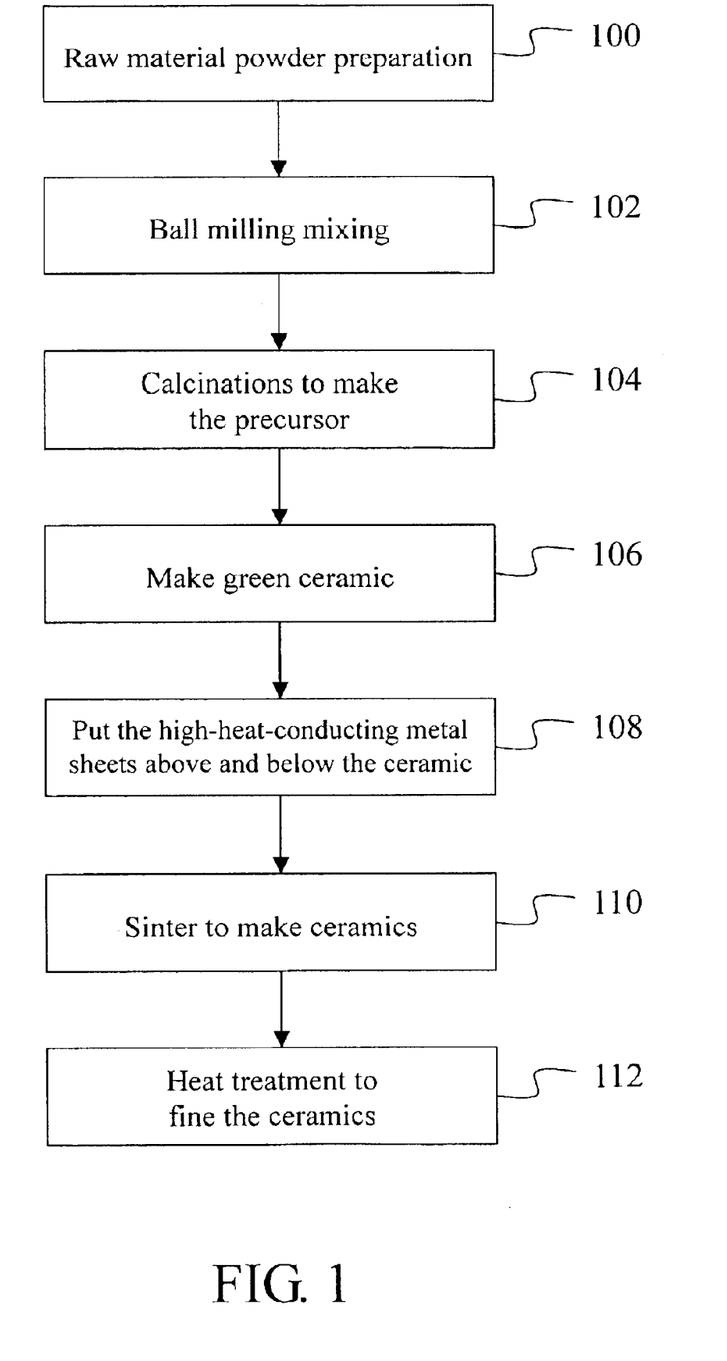
FIG. 1 is a flowchart illustrating steps of the ceramics production method according to an embodiment of the present invention.

Refer to FIG. 1, which is a flowchart illustrating steps of the ceramics production method according to an embodiment of the present invention.

The method begins in step 100 by preparing the raw material powder. The raw material powder comprises, which could have evaporative phenomena during the high-temperature sinter or the powder which is heat-sensitive, even the raw ceramics material which has no special requirement on general process, for example, lithium carbonate, aluminum oxide, silicon oxide, tungsten oxide, zircon oxide, lithium oxide, niobium oxide, valium oxide, yttrium oxide, barium carbonate, or titanium oxide. For explanation purpose, the manufacture of LAS ceramics is used as an example. Therefore, the raw material powder comprises lithium carbonate, aluminum oxide and silicon oxide. The mole ratio of lithium carbonate, aluminum oxide and silicon oxide is about 1:1:2 to 1:1:3.

Next, in step 102, a ball milling mixing process is performed which uniformly mixes the lithium carbonate, aluminum oxide and silicon oxide powders. After mixing the powder is dried in an oven. Note, ethanol may be uses as a solvent in the wet type ball-milling step.

In step 104 a calcinations process is performed to make a precursor. After drying, the powder is put inside an aluminum oxide crucible and placed into an oven. A calcinations treatment is performed at a temperature of 500° C. to 700° C. for about 12–36 hours at a temperature elevation rate of 5° C./min. After calcinations, the raw material powder becomes the precursor.

Then in step 106, the precursor after calcinations is milled in the aluminum oxide crucible and put in a press mold and pressed at, for example, 350 Kg/cm$^2$ to make the green ceramic.

In step 108, the high-heat-conducting metal sheets are attached to the top and bottom surfaces of the green ceramic. The high-heat-conducting metal sheet is attached by, for example, pasting. The material of the high heat-conducting metal sheet comprises a metal of which the conducting coefficient is higher than 10 W/mK, for example, a platinum sheet.

In step 110, a sintering process is performed to make the ceramics. The green ceramic covered with the high-heatconducting metal sheets is placed inside a oven and sintered for 2–24 hours at a temperature ranging from 850° C. to 1400° C. Then cool by decreasing the temperature to obtain the sintered ceramics. After sintering, the mole ratio of the lithium oxide, aluminum oxide and silicon oxide of the sintered ceramic is 1:1:2 to 1:1:3.

Finally, in step 112 a heat-treatment process is performed to make the ceramics denser and the structure more stable. After the ceramics complete the sintering process, it is put inside an oven and heated at a temperature-elevation rate of 1° C./min to 8° C./min to 800° C. Then to decrease to the room temperature at a temperature-decreasing rate of 1° C./min to 8° C./min. This procedure is repeated several times to produce the ceramics with a denser and more stable structure.

As noted earlier, during the manufacture of LAS ceramics, if the mixing powder of lithium carbonate, aluminum oxide and silicon oxide are not processed by the precursor from calcinations treatment (step 100 to step 104), during the sintering process of the green ceramic the lithium carbonate powder will corrode the oxide or ceramics parts at high temperature. Therefore, the method of the present invention prepares the raw material powder with the calcinations treatment to precursor, wherein the lithium carbonate powder first composes and evaporates the carbon dioxide, and reacts the silicon dioxide into the solid solution phase of lithium silicate, which successfully prevents the phenomena caused by the lithium carbonate powder.

Figure 2:
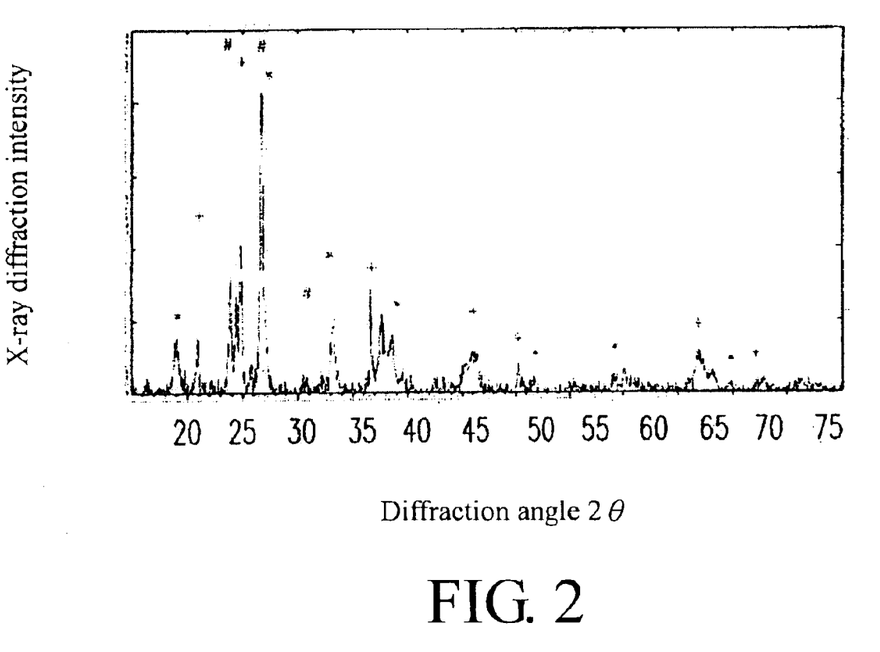
FIG. 2 is a graph showing X-ray diffraction (XRD) analysis of the precursor according to an embodiment of the present invention.

Refer to FIG. 2, which is a graph showing X-ray diffraction analysis of the precursor according to an embodiment of the present invention.

In FIG. 2, the symbol * represents $Li_2SiO_3$, symbol # represents $Li_2Si_2O_5$, and symbol + represents $SiO_2$. The precursor which has completed calcinations produces a diffraction peak at a diffraction angle 2 θ=24 deg and at a diffraction angle 2 θ=27 deg. The diffraction peak is the diffraction peak of lithium silicate ($Li_2Si_2O_5$), and illustrates that after calcinations the lithium carbonate reacts with silicon dioxide to produce lithium silicate.

Also, the present invention ensures the ceramics are heated uniformly by attaching the high-heat-conducting metal sheets on the top and bottom of the ceramics during the sinter process. After the sinter process, a proper heat treatment process is performed to achieve the ceramics body with a denser and more stable structure (step 106 to step 112).

Following is a detailed description using an example 1, an example 2 and a comparative example to better describe the present invention.

For example 1, the method is as follows. After homogeneously mixing the lithium carbonate, aluminum oxide, and silicon oxide powder with 1:1:2 molar ratio by way of wet-typed ball-milling, dry out using a baking oven. Next, put the powder after drying inside an aluminum oxide crucible, and put inside an oven. Then, treat for 24 hours by calcinations at a temperature-elevation rate of 5° C./min to 550° C. Use the aluminum oxide crucible to grind the powder after calcinations and put in a press mold, and press at a pressure of 350 $Kg/cm^2$ to manufacture the green ceramic. Next, attach the high heat-conducting metal sheets above and below the ceramics and place inside an oven. Heat to 1150° C. first at a temperature-elevation rate of 5° C./min, and then heat to 1300° C. at a temperature-elevation rate of 1° C./min. Allow to remain for 12 hours to sinter and then decrease the temperature at a rate of 5° C./min to room temperature to produce the sintered ceramics.

For example 2, the method is as follows. After homogeneously mixing lithium carbonate, aluminum oxide, and silicon oxide powder with 1:1:2 molar ratio by wet-typed ball-milling, dry out using a baking oven. Next, put the powder after drying inside an aluminum oxide crucible, and place inside an oven. Treat for 24 hours by calcinations at a temperature-elevation rate of 5° C./min to 550° C. Use an aluminum oxide crucible to grind the powder after calcinations and put inside a press mold. Press at a pressure of 350 $Kg/cm^2$ to manufacture the green ceramic. Next, attach the high heat-conducting metal sheets above and below the ceramics and put inside an oven. Heat to 1150° C. first at a temperature-elevation rate of 5° C./min, and then heat to 1300° C. at a temperature-elevation rate of 1° C./min. Allow to remain for 12 hours to sinter and then decrease the temperature at a speed of 5° C./min to room temperature to produce the sintered ceramics. Next, perform a heat treatment process by capping the ceramics with the high heat-conducting metal sheets. Place inside an oven and heat to 800° C. at a temperature-elevation rate of 5° C./min and then decrease the temperature at a speed of 5° C./min to room temperature. Repeat the steps of temperature-elevation and temperature-decreasing 4 times to produce the ceramics with fine and more stable structure.

For the comparative example, the method is as follows. After homogeneously mixing the lithium carbonate, aluminum oxide, and silicon oxide powder with 1:1:2 molar ratio by wet-typed ball-milling, dry out using a baking oven. Next, put the powder after drying inside an aluminum oxide crucible, and place inside an oven. Treat for 24 hours by calcinations at a temperature-elevation rate of 5° C./min to 550° C. Use the aluminum oxide crucible to grind the powder after calcinations and put inside a press mold and press at a pressure of 350 $Kg/cm^2$ to form the green ceramic. Next, put them inside an oven. Heat to 1150° C. first at a temperature-elevation rate of 5° C./min and then heat to 1300° C. at a temperature-elevation rate of 1° C./min. Allow to remain for 12 hours to sinter and then decrease the temperature at a speed of 5° C./min to room temperature to produce the sintered ceramics.

Basically, the difference between the three examples is that example 1 does not comprise the heat treatment process as in example 2 and the comparative example does not comprise the heat treatment process as in example 2 and the attached high temperature metal sheets as in examples 1 and 2.

Figure 3A:
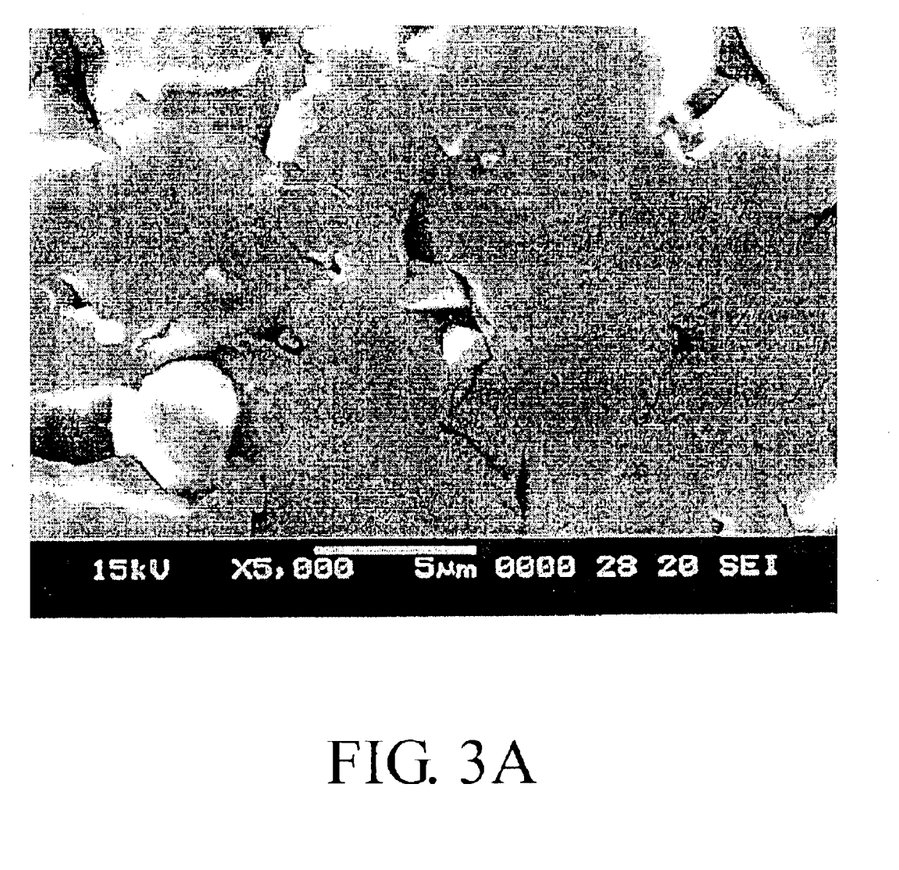
FIG. 3A is a scanning electron microscope (SEM) picture of the LAS ceramics material of example 1.
Figure 3B:
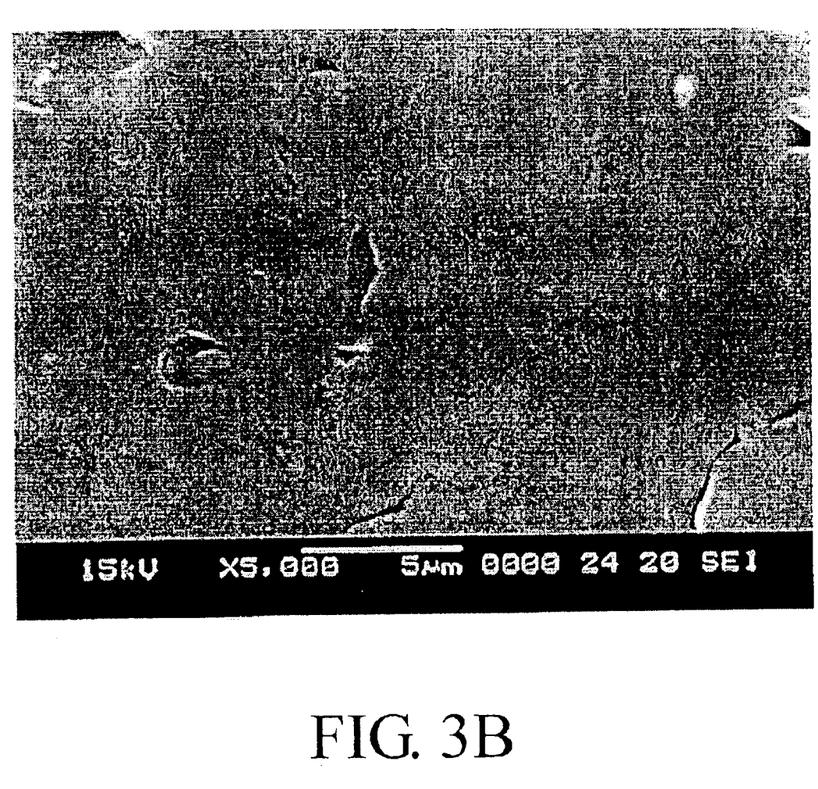
FIG. 3B is the SEM picture of the LAS ceramics material of example 2.
Figure 3C:
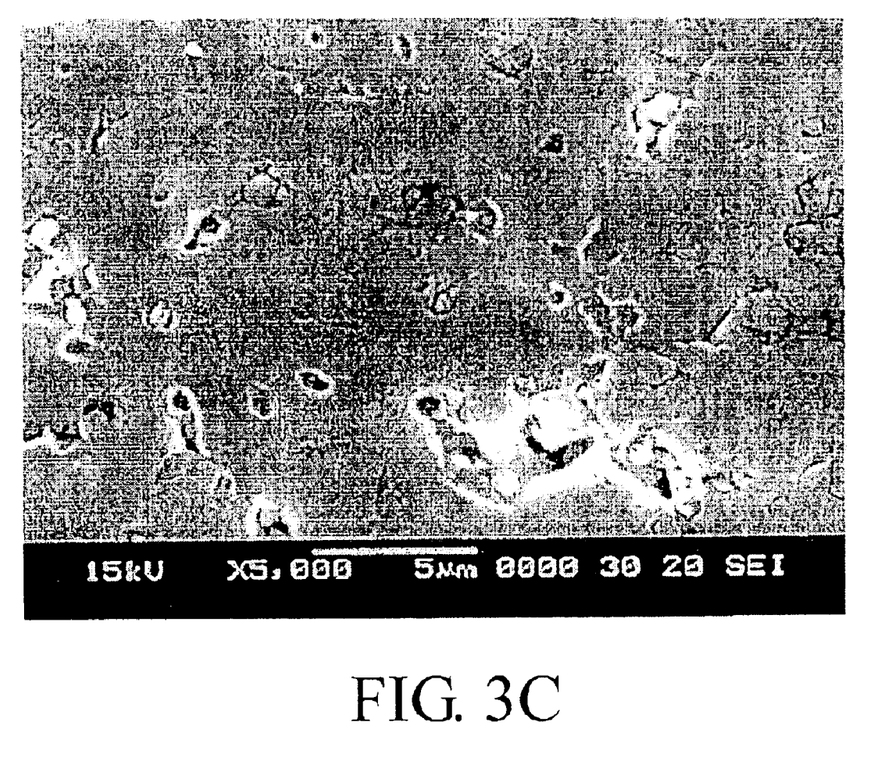
FIG. 3C is the SEM picture of the LAS ceramics material of the comparative example.

Refer to FIG. 3A, which is a SEM picture of the LAS ceramics material of example 1, FIG. 3B, which is a SEM picture of the LAS ceramics material of example 2, and FIG. 3C, which is a SEM picture of the LAS ceramics material of the comparative example.

As shown in FIG. 3A and FIG. 3C, during the sintering process the grain and crystal structure of the sinter ceramics achieved by using the upper and lower high heat-conducting metal sheet as a cap, is more complete and uniform than without being capped as in FIG. 3C. Thus, during the sinter process, the green ceramic is heated more uniformly by attaching the high heat-conducting metal on the top and bottom surfaces of the ceramic.

Additionally, as shown in FIG. 3B, with a heat-treatment process after the sinter process is finished, the structure is denser and more stable in comparison with the ceramics without heat treatment as in FIG. 3A. This is because that during the slow temperature elevation process, the grains will recovery and re-grow to form ceramics with fine and stable structure.

Figure 4:
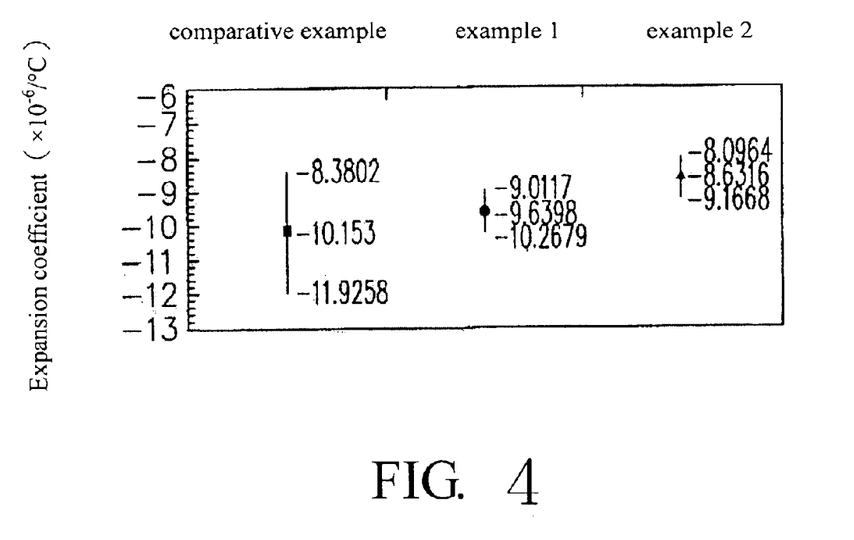
FIG. 4 is a graph illustrating the average expansion coefficient and the standard error value of the LAS ceramics material of example 1, example 2 and the comparative example, measured by the thermal mechanical analysis (TMA) instrument.

Refer to FIG. 4, which is a graph illustrating the average expansion coefficient and the standard error value of the LAS ceramics material of example 1, example 2 and the comparative example, measured by TMA.

In FIG. 4, symbol ● represents example 1, symbol ▲ represents example 2, and symbol ■ represents the comparative example. As shown in the results of FIG. 4, the average expansion coefficient values of example 1, example 2 and the comparative example are $-9.64 \times 10^{-6}/°$ C., $-8.63 \times 10^{-6}/°$ C. and $-10.15 \times 10^{-6}/°$ C., respectively. Thus, from FIG. 4 it is clear that example 2 has a more equal and stable expansion coefficient compared with example 1 and the comparative example.

Figure 5:
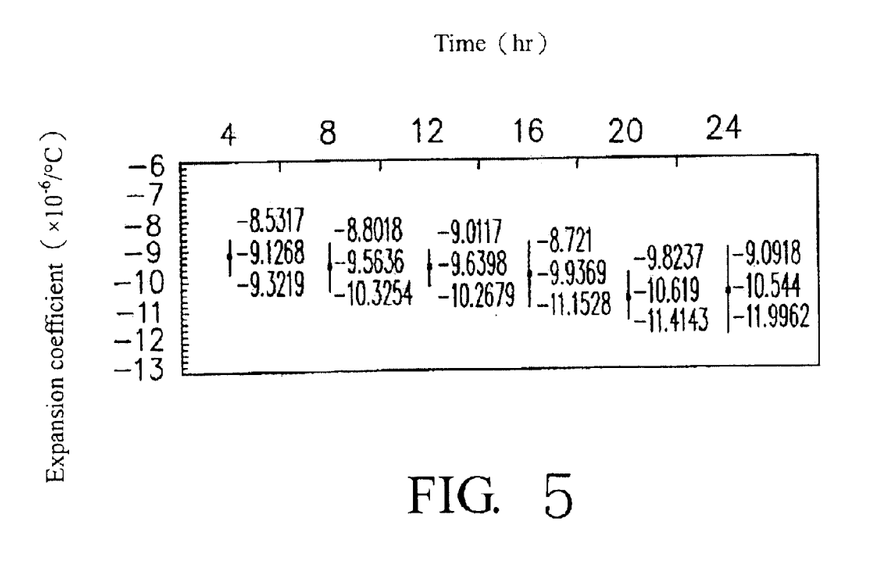
FIG. 5 is a graph illustrating the average expansion coefficient and the standard error of deviation of the LAS ceramics material of example 1 measured by TMA at a sinter temperature of 1300° C.

Refer to FIG. 5, which is a graph illustrating the average expansion coefficient and the standard error of deviation of the LAS ceramics material of example 1 measured by TMA at a sinter temperature of 1300° C. and various hold time.

As shows in FIG. 5, the average expansion coefficient of the LAS ceramics material of example 1 varies as the retention time increases and reaches a fixed value. In FIG. 5, the maximum average expansion coefficient value of the LAS ceramics material of example 1 reaches—$10.62 \times 10^{-6}/°$ C.

Figure 6A:
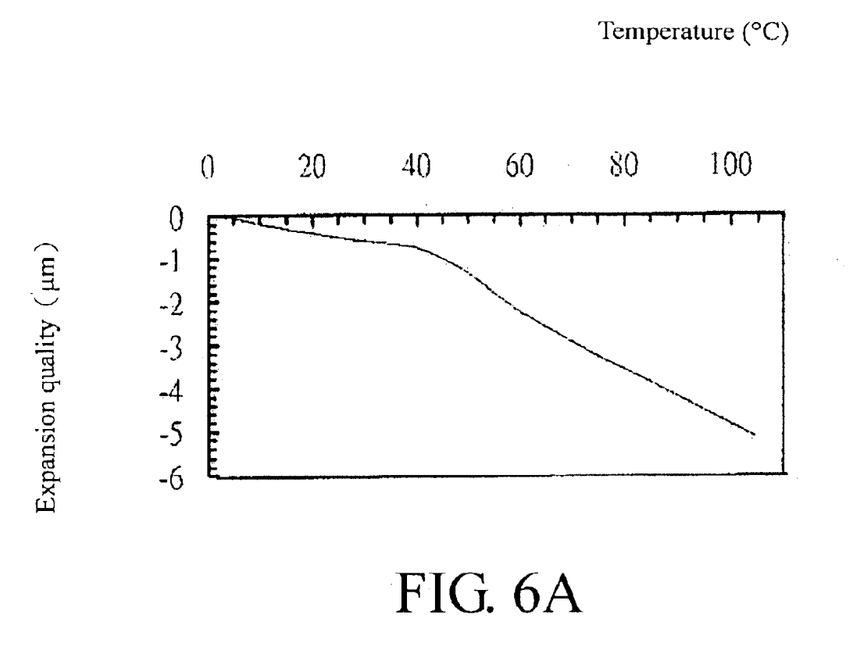
FIG. 6A is a graph showing the expansion curve of the LAS ceramics of example 1.
Figure 6B:
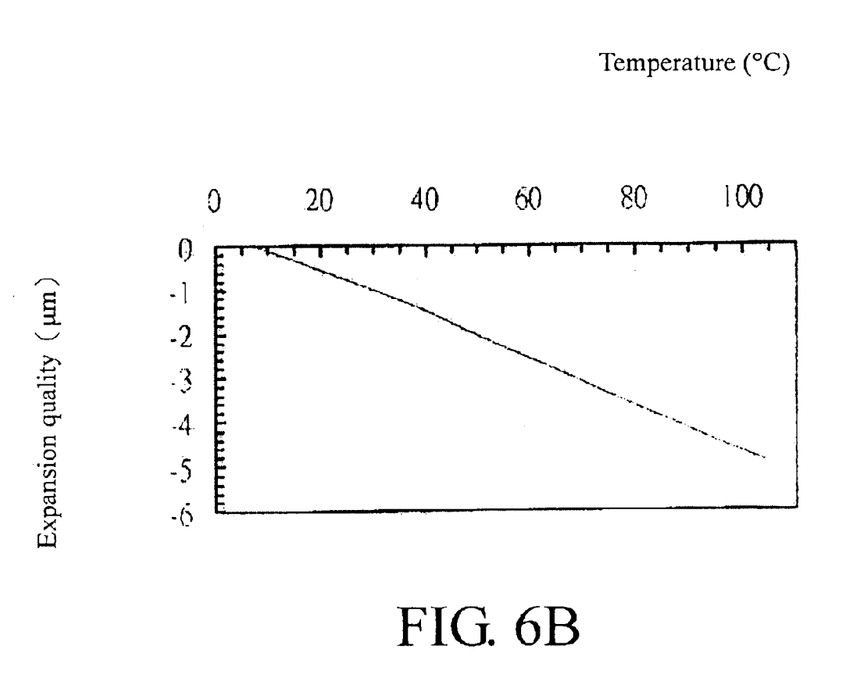
FIG. 6B is a graph showing the expansion curve of the LAS ceramics of example 2.

Refer to FIG. 6A, which is a graph showing the expansion curve of the LAS ceramics material of example 1 and FIG. 6B, which is a graph showing the expansion curve of the LAS ceramics material of example 2.

Figure 7A:
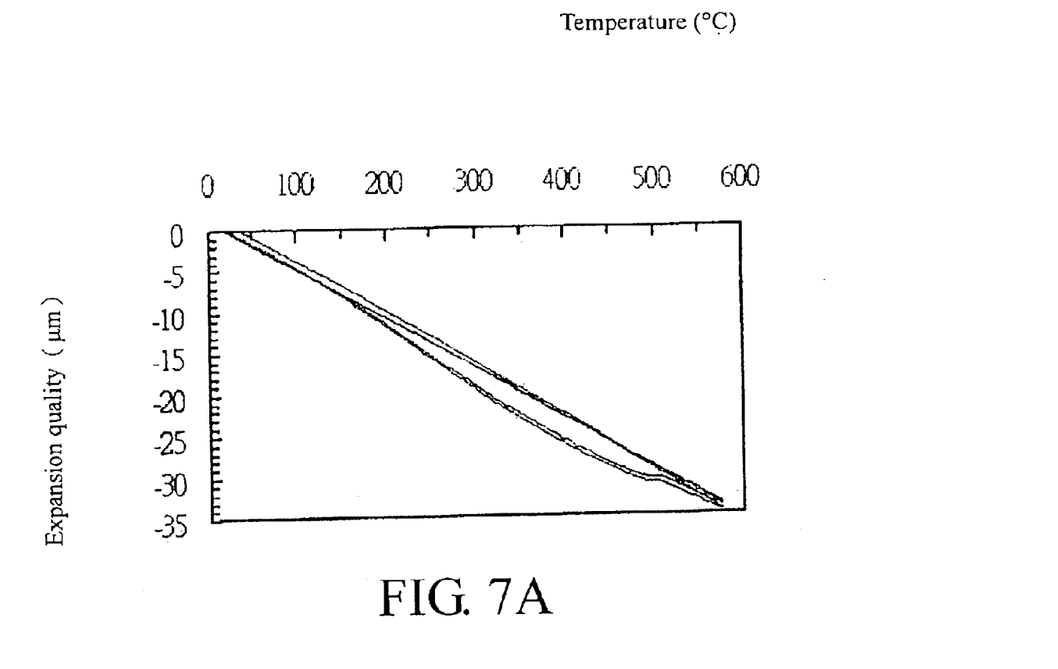
FIG. 7A is a graph showing the expansion curve and hysteresis of the LAS ceramics material of example 1 during the process of repeated thermal cycles.
Figure 7B:
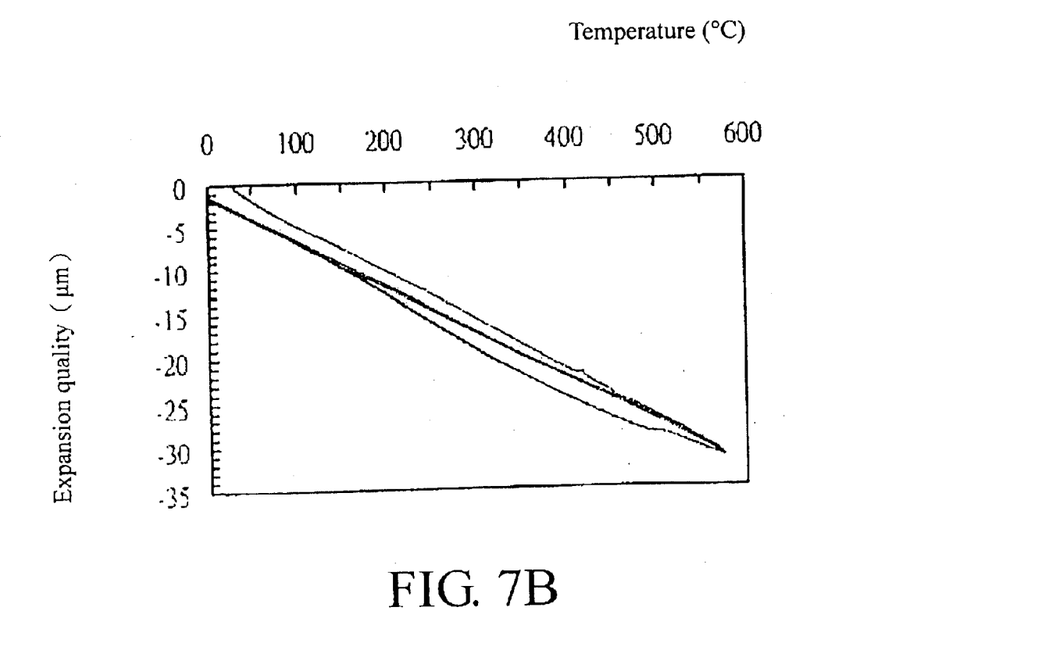
FIG. 7B is a graph showing the expansion curve and hysteresis of the LAS ceramics material of example 2 during the process of repeated thermal cycles.

Also, refer to FIG. 7A, which is a graph showing the expansion curve and hysteresis of the LAS ceramics material of example 1 during the process of repeated raising and lowering of temperature, and FIG. 7B, which is a graph showing the expansion curve and hysteresis of the LAS ceramics material of example 2 during the process of repeated raising and lowering of temperature.

As shown in the results illustrated in FIGS. 6A, 6B, 7A and 7B, the ceramics after heat treatment have an expansion coefficient which is more linear and more stable and with an improvement in the hysteresis and nonlinear instability phenomena caused by the process of repeated raising and lowering of temperature.

The present invention discloses producing ceramics material utilizing a solid-state sinter method, capping with the high heat conducting metal sheets during all the ceramic-heated process (including sinter and heat treatment) to ensure uniform heating of the ceramics. The high heat-conducting metal sheets are tightly pasted to the ceramics to improve the uniformity of the heat transfer. Furthermore, after the sinter process, a heat treatment process is performed to prevent any instability phenomena and hysteresis of the ceramics caused by thermal expansion.

During the manufacture of LAS ceramics, if the mixing powders of lithium carbonate, aluminum oxide and silicon oxide are not processed by the precursor calcinations treatment, during the sintering process of the green ceramic the lithium carbonate powder will corrode the oxide or ceramics at high temperature. Therefore, the method of the present invention prepares the precursor with the calcinations treatment, wherein the lithium carbonate powder first composes and evaporates the carbon dioxide, and reacts the silicon dioxide into the solid solution phase of lithium silicate, which successfully prevents the phenomena caused by the lithium carbonate powder.

Additionally, the present invention caps the top and bottom surfaces of the ceramics with high heat conducting metal so that during the sinter process heat is transferred to the green ceramic more uniformly. Therefore, the grains are uniformly heated and reacted during the sinter process to reduce aggregate effects of the anisotropic crystals so that they are more randomly arranged and distributed between the whole grains of ceramic crystal. Furthermore, the subsequent heat-treatment process makes the grains recovery and re-grow so that the ceramics with a denser and more stable structure are achieved.

The above description of the present invention uses the synthesizing the LAS ceramics for explanation. Obviously, the scope of this invention is not limited to synthesizing LAS ceramics, but is also applicable to manufacturing other kinds of ceramics. For example in other embodiments of the present invention, various kinds of raw material powders are mixed and then the processes of calcinations, forming the green ceramic, pasting the high heat conducting metal sheets above or below the ceramic, sintering, and heat are performed. In this way, denser ceramics of better quality are produced. The raw material powder is not limited to lithium carbonate, aluminum oxide and silicon oxide used by example but comprises raw material powder that is heat-sensitive or has evaporation characteristics during high-temperature sinter.

For example, raw material powder comprising, lithium carbonate, aluminum oxide, silicon oxide, tungsten oxide, zircon oxide, lithium oxide, niobium oxide, valium oxide, yttrium oxide, barium carbonate, or titanium oxide. Utilizing a raw material powder with various components and using the method of the present invention various ceramic materials such as Yttrium Orthovanadate ($YVO_4$) ceramics material, Zirconium Tungstate ($ZrW_3O_8$) ceramics material, Lithium Niobate ($LiNbO_3$) ceramics material and Barium Titanate ($BaTiO_3$) are produced.

In view of the foregoing, it is intended that the present invention cover modifications and variations of this invention provided they fall within the scope of the invention and its equivalent.

Although this invention is disclosed as above with preferred embodiments, one who is familiar with the art, though not to limit this invention, could make any change or modification without departing from the spirit and claims of this invention, thus the claim of the present invention should be viewed as defined by the claims.

What is claimed is:

1. A method of producing LAS ceramics comprising:
   providing lithium carbonate, aluminum oxide, and silicon oxide as a raw material powder,
   mixing, grinding, and then drying the raw material powder;
   performing a calcinations process on the raw material powder to form a precursor;
   pressing the precursor into a green ceramic;
   attaching high thermal conducting metal sheets above and below surfaces of the green ceramic;
   performing a sinter process to turn the green ceramic into ceramic; and,
   performing a heat treatment process on the ceramic.

2. The method of producing LAS ceramics of claim 1, wherein the mixing and grinding are performed by ball milling.

3. The method of producing LAS ceramics of claim 1, wherein the lithium carbonate, aluminum oxide and silicon oxide molar ratio is between 1:1:2 and 1:1:3.

4. The method of producing LAS ceramics of claim 1, wherein the high thermal conducting metal sheet comprises a metal with a conductive coefficient larger than 10 W/mK.

5. The method of producing LAS ceramics of claim 4, wherein the high thermal conducting metal sheet comprises platinum.

6. The method of producing LAS ceramics of claim 1, wherein the lithium oxide, aluminum oxide and silicon oxide molar ratio is between 1:1:2 and 1:1:3.

7. The method of producing LAS ceramics of claim 1, wherein the calcinations process is performed at a temperature between 500° C. and 700° C.

8. The method of producing LAS ceramics of claim 1, wherein the calcinations process is retained at temperature for between 12 and 36 hours.

9. The method of producing LAS ceramics of claim 1, wherein the sinter process is performed at a temperature between 850° C. and 1400° C.

10. The method of producing LAS ceramics of claim 1, wherein the sinter process is retained at temperature for between 2 and 24 hours.

11. The method of producing LAS ceramics of claim 1, wherein the heat treatment process comprises:

(a) raising the ceramic to a first temperature;

(b) lowering the ceramic from the first temperature to a second temperature; and (c) repeating step (a) and step (b).

12. The method of producing LAS ceramics of claim 11, wherein temperature is raised at a rate of between 1° C./min and 8° C./min.

13. The method of producing LAS ceramics of claim 11, wherein temperature is lowered at a rate of between 1° C./min and 8° C./min.

14. The method of producing LAS ceramics of claim 11, wherein the first temperature is 800° C., and the second temperature is 25° C.

15. A method of producing ceramics comprising:

providing a precursor;

pressing the precursor into an green ceramic;

attaching high thermal conducting metal sheets above and below surfaces of the green ceramic;

performing a sinter process to sinter the green ceramic into a ceramic; and, performing a heat-treatment process on the ceramic, the heat-treatment process including:

(a) raising the ceramic to a first temperature;

(b) lowering the ceramic from the first temperature to a second temperature; and (c) repeating step (a) and step (b).

16. The method of producing ceramics of claim 15, wherein lowered at a rate of between 1° C./min and 8° C./min.

* * * * *